(No Model.)
R. E. CAVINESS & G. McCORMICK.
TRIP-WIRE FOR CHECK ROW CORN PLANTERS.
No. 271,419. Patented Jan. 30, 1883.
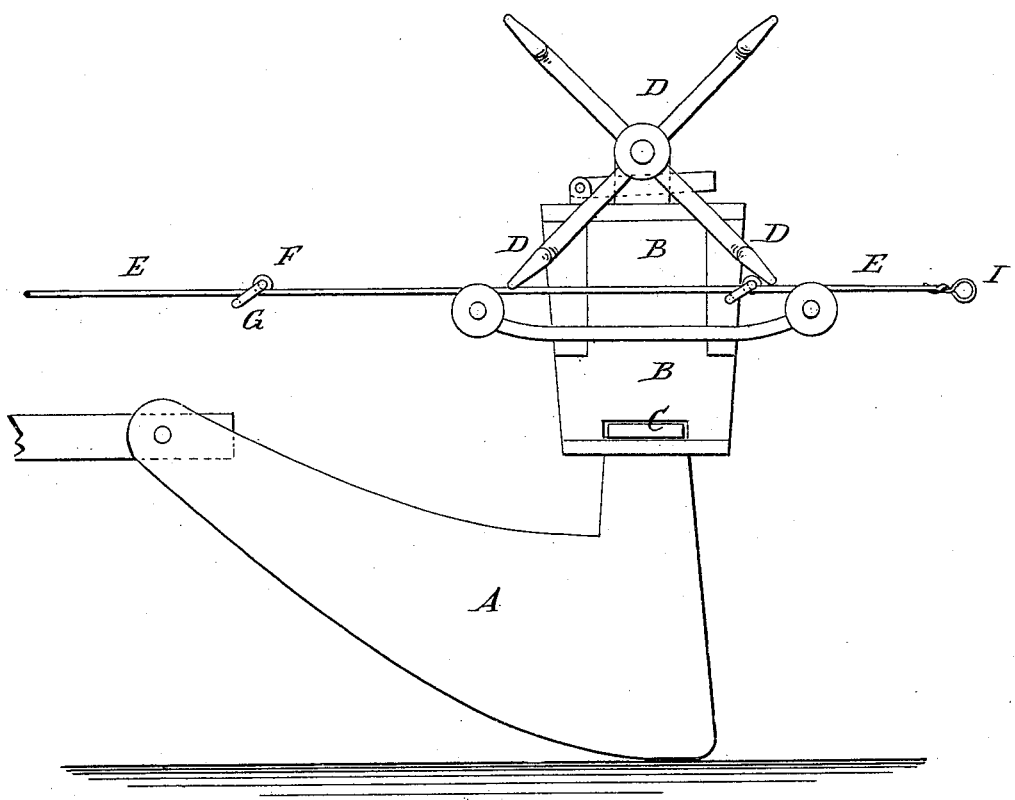
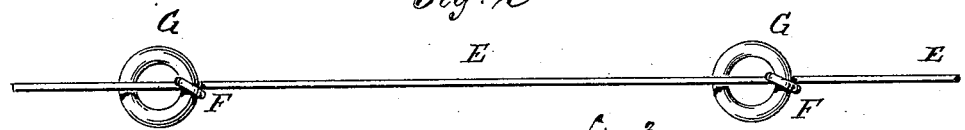
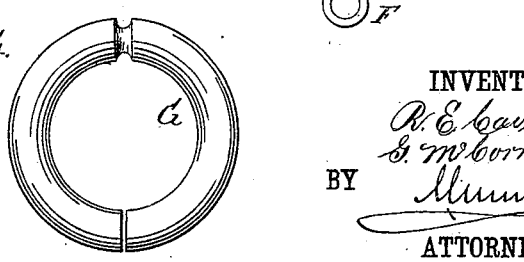
WITNESSES:
Chas. Nias
C. Sedgwick
INVENTOR:
R. E. Caviness
G. McCormick
BY Munn & Co
ATTORNEYS.

UNITED STATES PATENT OFFICE.

RICHARD E. CAVINESS AND GEORGE McCORMICK, OF BECKWITH, IOWA.

TRIP-WIRE FOR CHECK-ROW CORN-PLANTERS.

SPECIFICATION forming part of Letters Patent No. 271,419, dated January 30, 1883.

Application filed May 3, 1882. (No model.)

*To all whom it may concern:*

Be it known that we, RICHARD E. CAVINESS and GEORGE McCORMICK, of Beckwith, in the county of Jefferson and State of Iowa, have invented a certain new and useful Improvement in Trip-Wires for Check-Row Corn-Planters, of which the following is a full, clear, and exact description.

Reference is to be had to the accompanying drawings, forming a part of this specification, in which similar letters of reference indicate corresponding parts in all the figures.

Figure 1 is a side elevation of our improvement shown as applied to a corn-planter. Fig. 2 is a plan view of a part of the trip-wire. Fig. 3 shows a loop coil or eye of the trip-wire, the ring being removed. Fig. 4 is a plan view of one of the rings enlarged.

The object of this invention is to facilitate and cheapen the manufacture of trip-wires for check-row corn-planters, and at the same time produce a more reliable article.

The invention consists in a trip-wire for check-row corn-planters, constructed with eyes at regular intervals, and having rings secured in the said eyes, and also in the rings made with grooves around them, to prevent them from slipping in the eyes of the trip-wire, as will be hereinafter fully described.

A represents the runners; B, the seed-box; C, the seed-dropping slide, and D the spoke-wheel that operates the seed-dropping slide C, and is operated by the trip-wire E. The trip-wire E extends across the field, and is secured to the ground at the sides of the field by stakes.

Upon the wire E, at a distance apart equal to the required distance apart of the hills, are formed loops, coils, or eyes F, through each of which is passed an open ring, G. The rings G are then closed, securely fastening them to the eyes F. The center of the piece of wire of which each ring G is formed may have a groove, H, formed around it to receive the eye F, and prevent the said ring from slipping in the said eye, even should the said ring be forced open by accidental pressure.

The wire E can be made of sufficient length to extend across the field; or it can be made in lengths of ten, twenty, or eighty rods, or of any other desired length. In the latter case loops or coils I should be formed upon the ends of the sections, and the adjacent ends of the sections connected by rings in the same manner as shown in Letters Patent No. 234,243, granted to us November 9, 1880, or in any other convenient manner.

It will be understood that the rings G, when made plain or without the grooves H, will do good service, and that when a light wire, E, is used the eyes F, that receive the plain or grooved rings G, may be formed of two or more coils instead of a single coil, as shown in the drawings.

Having thus described our invention, we claim as new and desire to secure by Letters Patent—

1. In a trip-wire for check-row corn-planters, the combination, with the wire E, having the eye F, of the ring G, said ring bearing at one side upon the upper surface of the wire and at its opposite side against the under side of the wire, as shown and described.

2. In a trip-wire for check-row corn-planters, the combination, with the wire E, having the eye F, of the ring G, passed through and embraced by the said eye, and having an annular groove, H, which receives the wire of the eye, said ring bearing at one side upon the upper surface of the wire and at its opposite side against the under side of the wire, as shown and described.

RICHARD E. CAVINESS.
GEORGE McCORMICK.

Witnesses:
ISAAC D. JONES,
GEORGE W. YOUNG.